United States Patent [19]

Bock et al.

[11] Patent Number: 4,588,150
[45] Date of Patent: May 13, 1986

[54] DOCKING DEVICE FOR SPACE VEHICLE

[75] Inventors: Jürgen Bock, Delmenhorst; Gerd Gloyer, Ganderkesee; Horst Richter, Delmenhorst; Roland Felkei, Bremen, all of Fed. Rep. of Germany

[73] Assignee: ERNO-Raumfahrttechnik GmbH, Bremen, Fed. Rep. of Germany

[21] Appl. No.: 486,988

[22] Filed: Apr. 20, 1983

[30] Foreign Application Priority Data

Apr. 23, 1982 [DE] Fed. Rep. of Germany ....... 3215229

[51] Int. Cl.$^4$ .............................................. B64G 1/64
[52] U.S. Cl. ..................................... 244/161; 244/115
[58] Field of Search ................... 244/158 R, 159, 161, 244/135 A, 115, 116, 2, 3; 114/250, 249, 261; 280/484

[56] References Cited

U.S. PATENT DOCUMENTS 2,692,103 10/1954 Cobham et al. ................ 244/135 A
3,389,877 6/1968 Huber et al. ........................ 244/161
4,177,964 12/1979 Hujsak et al. ...................... 244/161
4,236,686 12/1980 Barthelme et al. ............. 244/135 A
4,295,740 10/1981 Sturges ................................ 244/161
4,381,092 4/1983 Barker ................................ 244/161
4,395,005 7/1983 Ganssle .............................. 244/161

FOREIGN PATENT DOCUMENTS 300682 11/1928 United Kingdom ................ 244/115

Primary Examiner—Galen L. Barefoot
Attorney, Agent, or Firm—Ralf H. Siegemund

[57] ABSTRACT

A docking device for space vehicles is disclosed wherein one coupling member of one vehicle is constructed as resiliently alignable telescopic rod having a head with latch structure which head is inserted in a coupling funnel of the other vehicle and having a latch trap in its bottom; the head sliding along the funnel wall during insertion and the latch is actuated thereby. The alignment of the rod may be controlled by a homing beacon.

5 Claims, 5 Drawing Figures

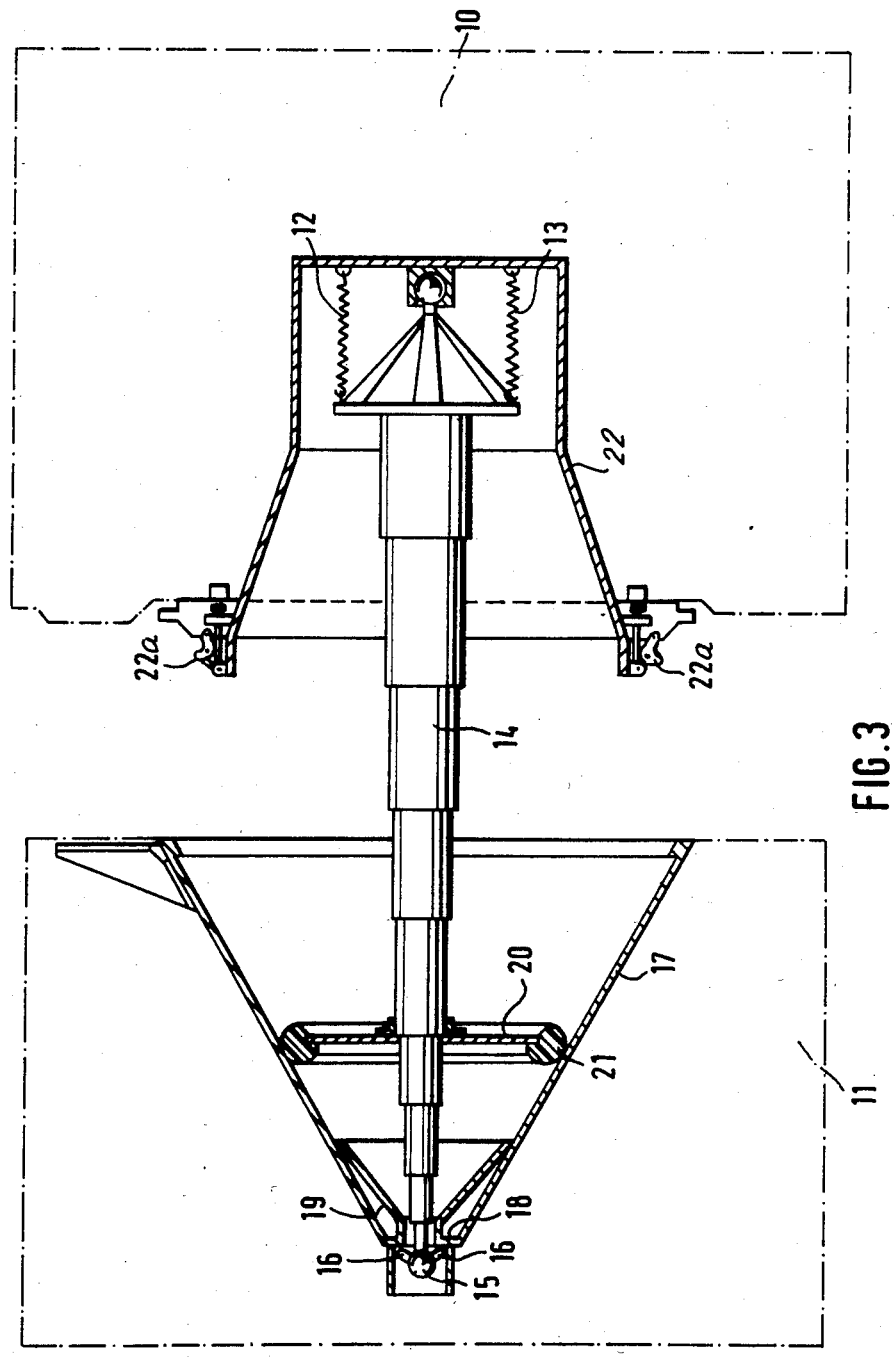

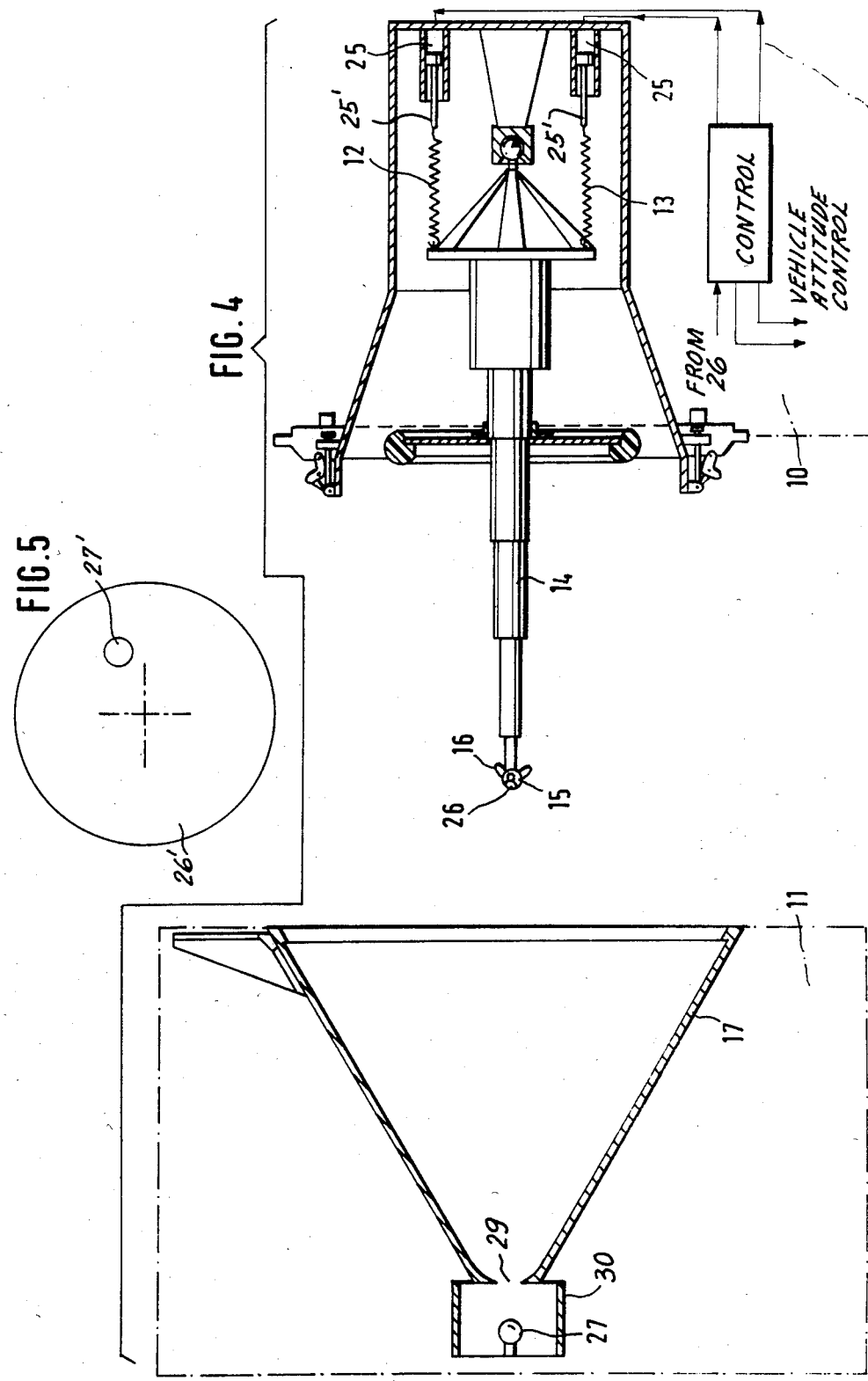

DOCKING DEVICE FOR SPACE VEHICLE

BACKGROUND OF THE INVENTION

The present invention relates to a structure for docking and coupling two space vehicles together each of the space vehicles having correspondingly mating coupling elements to effect docking and interconnection.

The docking and interconnection of two separate space vehicles is a task of specific difficulties and requires especially constructed coupling elements. Such coupling elements and devices have to be able to interconnect two mutually approaching space vehicles even if they are not properly aligned. Moreover, such coupling and docking structures are required to absorb the relative kinetic energy between the two space vehicles upon engagement following which the two vehicles are to be rigidly and securely interconnected.

DESCRIPTION OF THE INVENTION

It is an object of the present invention to provide a new and improved docking and coupling structure for space vehicles of the type mentioned above which is capable of securely interconnecting two approaching space vehicles.

In accordance with the preferred embodiment of the present invention, it is suggested to construct one coupling element as extending from one space vehicle as a resiliently aligned or alignable telescopic rod carrying a head with retractible latch members while the other space vehicle is provided with a coupling funnel having at its bottom a trap for the latch to complete coupling. The final mutual orientation and alignment of the vehicles can be effected passively or actively.

The inventive construction is endowed with a variety of very advantageous features. For example, the resilient alignment of the telescopic rod provides a resilient yielding upon engaging the funnel element of the respective other space station and upon contact therewith, i.e., during the docking procedure. This feature provides specifically for compensation of misalignment between the two space vehicles depending on the dimensions of the space vehicle and the dimensions of the coupling structure. Of course, there is a limit within which the misalignment can be compensated which can be expressed in terms of a solid angle and of a lateral displacement maximum. In particular, it is of advantage to provide the telescopic rod with an annular centering buffer connected with an impact absorbing cushion for purposes of particularly affecting the alignment as well as for purposes of absorbing the relative kinetic energy between the two space vehicles as they approach each other.

Another advantageous feature is the association of adjusting members with the spring mounts of the telescopic rod for purposes of providing a controlled alignment of the rod. Moroever, the head of the telescopic rod could be provided with an optical sensor for acquiring and detecting radiation signals emmanating from the funnel bottom of the respective other vehicle; a light transmitter is provided accordingly. This way, one obtains active alignment control via a homing beacon.

The signals as received by the head sensor can be used through a servo and feedback construction to modify and change the direction of extension of the telescopic rod for purposes of obtaining a better alignment, basically with the funnel axis along which the radiation beam is emitted. The optical sensor may, for example, be constructed as a quadrant photo diode operating an automatic feedback control for follow-up control of the telescopic rod to extend towards the light source. The light transmitter provided in the funnel bottom is basically of a beacon like constructin emitting modulated light at an angle commensurate with the angle of the funnel.

It is of further advantage to feed the signal used for controlling the direction of extension of the telescopic rod to a control system within the particular space vehicle so that, so to speak, the vehicle as a whole, i.e., through appropriate attitude and other controls can follow the change of direction as affected by the change of orientation of the rod. In other words, there is a double adjustment of alignment; one for changing the orientation of the space vehicle carrying the telescopic rod to be in fact in alignment with the beacon emitted from the other vehicle, while the particular angular adjustment of the telescopic rod constitutes the fine adjustment.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 illustrates the completed alignment and coupling of two space vehicles affected by the construction shown in FIGS. 1 and 2;

FIG. 4 is a view similar to FIG. 1, but illustrating an improved construction for active alignment control; and FIG. 5 is a schematic diagram illustrating the generation of position signals for controlling the position and solid angle of orientation of the telescopic rod shown in FIG. 4.

Proceeding now to the detailed description of the drawings and turning here particularly to FIG. 1, there are illustrated very schematically in dash dot line two space vehicles 10 and 11 in an approach phase. It is presumed, that the vehicles are more or less at rest in relation to each other. The space vehicle 10 is provided at one end with a telescopic rod 14 supported in a mounting funnel 22 in vehicle 10 by means of springs 12 and 13. The telescope 14 extends from a platform 14a which is supported by four springs, of which two are shown. The elements of the telescopic rod 14 can be telescoped into each other or extended into a position as shown under utilization of a coiled leaf spring in a manner known per se. This type of telescope extension is conventional and the strength is not illustrated in further detail. FIG. 1 shows partial protraction of the telescopic device 14.

Figure 1:
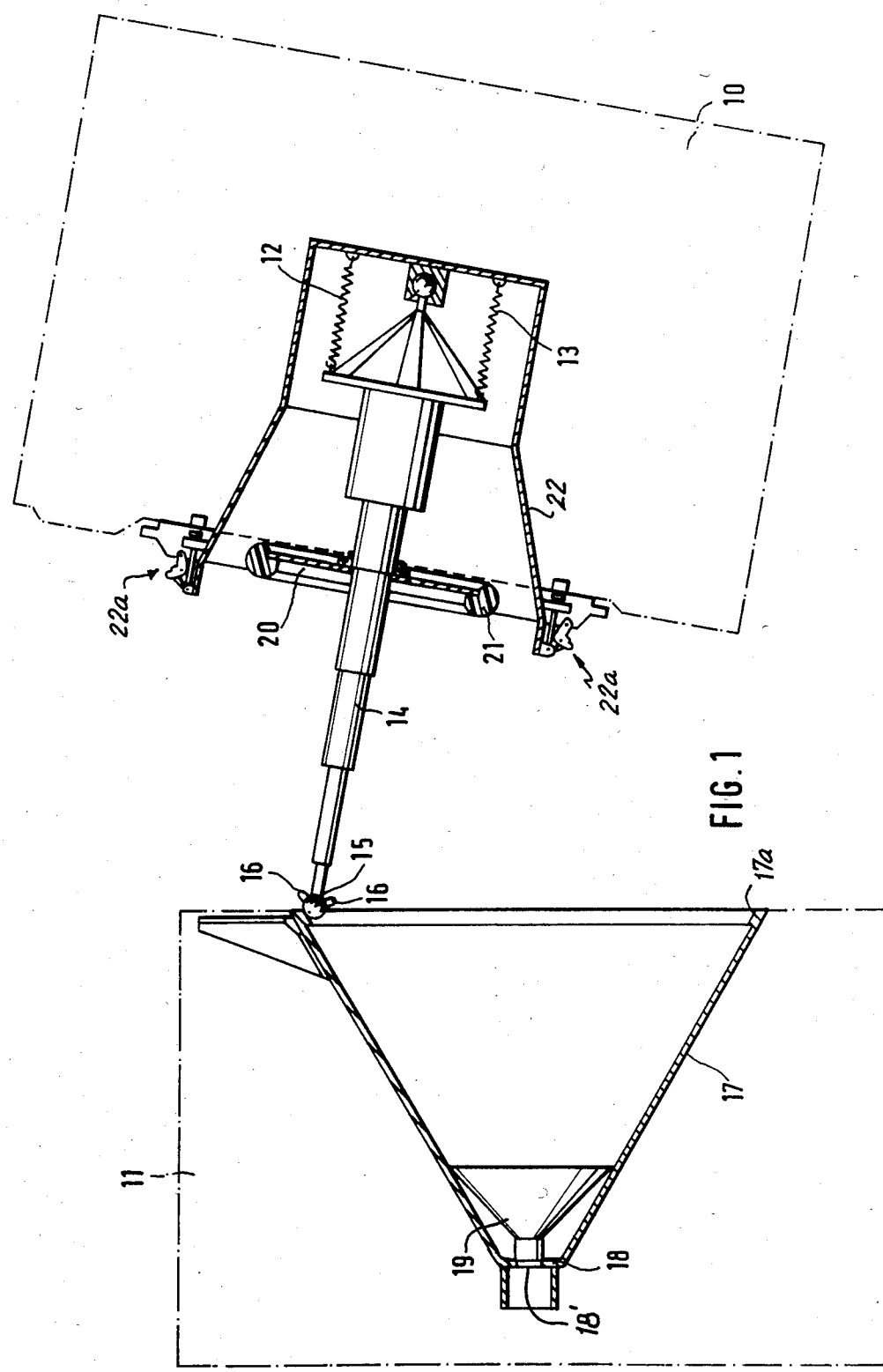
FIG. 1 illustrates in cross section the docking and coupling structure of two space vehicles in accordance with the preferred embodiment of the present invention for practicing the best passive mode of docking and depicting in particular an initial phase in the docking procedure.

The telescopic 14 is provided at its free end with a head 15 being basically of spherical construction and being provided with latch element 16 projecting at a mutual angle other than 180° in slightly rearward direction, i.e., back towards the space vehicle. These elements are resiliently biased for protraction or foldout, they can be retracted.

An annular centering buffer element 20 is provided on one of the telescopic elements of the rod 14. The dish shaped annulus is in addition provided along its periphery with an annular impact absorbing cushion 21. The annular resilient element 21 circumscribes the rod at a certain distance and provides largest radial extension thereof. The rod 14 together with the impact absorbing structure 20-21 extends in part through the funnel element 22 whereby the maximum annular deflection of the unextended rod 14 from a particular central access of the vehicle 10 is very limited, the limiting being effected by means of the cushioning structure as described. The outer perimeter of the funnel 22 is provided with additional latch elements 22a for purposes to be described below.

The second space vehicle 11 has a coupling counterpart which comprises basically a funnel shaped element 17 tapering an inward direction towards a relatively small funnel bottom 18. Latch trap structure 19 is provided at that bottom 18 for purposes of trapping the lock and latch elements 16 once the head 15 has passed through a central opening in the funnel bottom. A tubular extension of a centering funnel 19 is aligned with that bottom opening and constitutes the trap proper.

As stated above, FIG. 1 illustrates an initial phase of the docking procedure wherein the two space vehicles 10 and 11 are misaligned. The rod 14 is being extended or protracted and the head 15 on telescopic rod 14 just about enters the funnel 17. The telescopic rod 14 has not yet been fully extended at this point.

Figure 2:
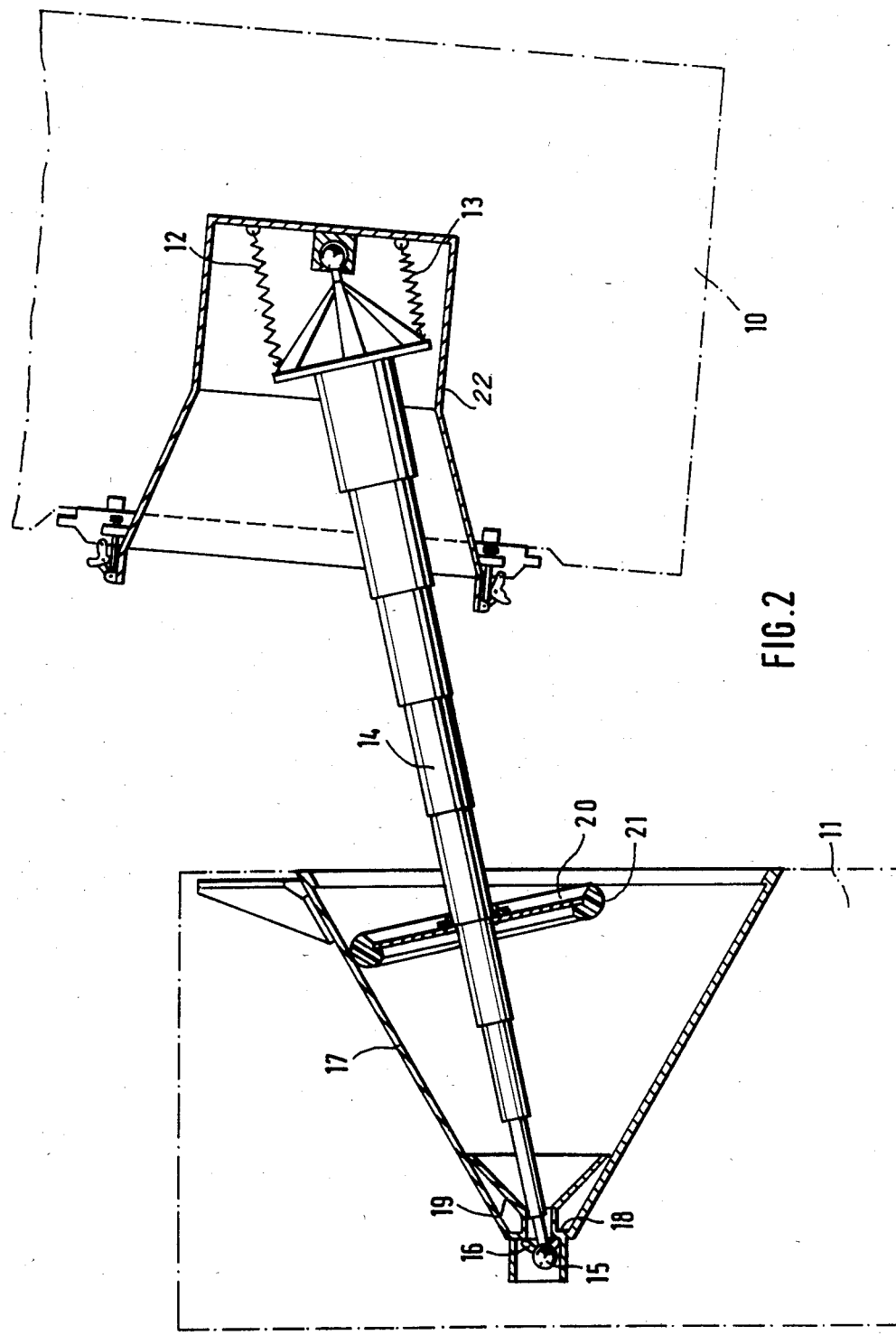
FIG. 2 shows the same structure as FIG. 1, but in a subsequent phase following the initial docking.

The telescopic rod as shown in FIG. 2 will be extended further whereby the head 15 slides along the wall of the funnel and the rod 14 will be deflected accordingly. The guiding and fine-centering funnel 19 at the bottom 18 of funnel 14 make sure that the head 15 will properly enter the opening 18' of bottom 18. The latching elements 16 are spring biased and will be pushed inwardly as the ball 15 passes through the latch trap. After the head 15 has passed through the opening 18' in bottom 18, the latch elements 16 will protract again and now the ball 15 with latch element 16 is trapped behind the bottom 18.

It can readily be seen that the annular centering buffer 20-21 will engage also the funnel wall 17 and will thereby absorb kinetic energy as it may exist between the two vehicles under consideration of the extending rod 14. This kinetic energy is developed as the rod 14 is now retracted to bring the vehicles into ultimate proximity in the next step.

As the telescope 14 is partially retracted that the trapped head 15 causes vehicle 11 to approach the vehicle 10 (or vice versa). On the other hand, the particular radial dimension of the structure 20 and 21 permits only a limited insertion of the front structure of the telescopic rod into the funnel 17. FIG. 3 shows maximum insertion permissible only under conditions in which the rod 14 becomes aligned with the axis of the funnel 17. The springs 12, 13 in turn realign the rod 14 with the axis of vehicle 10.

As the telescope 14 is further retracted, the latch elements 22a will enter the wide opening of funnel 17 and latch behind the rim 17' thereof thereby completing the docking and interconnection of the two vehicles. In other words, the final interconnection is not dependent on the coupling of the two vehicles through the head 15, but is a direct vehicle to vehicle connection in view of the fact that multiple connect points are involved the connection is indeed a rigid one.

The particular construction as described thus far, does not utilize any controlled motion of the telescopic rod 14 as far as pivoting is concerned, the only controlled motion is a protraction and retraction of the telescopic assembly. FIG. 4 illustrates a refinement of the construction and includes in particular active control of the angle of rod 14 vis-a-vis for example the longitudinal axis of space vehicle 10 or any other suitable reference line or plane. The modification as far as the structure of and in vehicle 10 is concerned involves the mounting of springs 12 and 13. Their ends previously affixed to the bottom of auxiliary funnel 22 are now affixed to the control rods 25', for example, hydraulic or pneumatic control elements and cylinders 25. These control elements may be provided in the plurality, i.e., only two are shown in one particular plane and another pair may be provided in a plane transversely to the plane of the drawing coacting with appropriate springs to establish tilting of the rod 14 in any direction within the confines of the construction.

The head 15 in this embodiment is provided with an optical sensing device 26 constructed, for example, as a quadrant photo diode which is basically oriented along the axis of the telescopic rod assembly 14. It can be said that the center point of the quadrant is traversed by the axis of the telescopic assembly. The funnel 27 in this embodiment and pertaining the second space vehicle, 11, is constructed slightly differently; the bottom is provided with a narrow opening 29, but behind the bottom 18 is provided a larger cylindrical arrangement 30 in which is centrally mounted a light emitter. The bottom 18 is in effect also as constructed diaphragm and the light source 27 can be deemed to be arranged in the apex of the funnel. Thus, the angle of light emission in conjunction with the diaphragm is such that a cone of radiation is emitted, the cone by established by the funnel 17. Moreover, the light intensity should be centered on the funnel axis with more or less gradual drop-off towards the funnel rim.

It can thus been seen that the vehicle 10 has approached vehicle 11 and is in effect already in alignment therewith, the quadrant cell and diode 26 receiving central light from the radiation source 27. Along the aligned axis, including a central alignment of the axis of rod 14, such angle of misalignment is detected by and through an imbalance in the various fields of the quadrant sensor. This imbalance represents primarily the misalignment of the axis of telescope 14 in relation to the axis of the funnel 17 assuming, of course, the telescopic rod 14 has a central position and zero zero orientation. FIG. 5 illustrates the defection range 26' of quadrant sensor 26, the cross defining the center and axis. Reference numeral 27' represents the maximum intensity of the beam as received.

Any imbalance monitored by detector 26 is fed to an electrical control circuit within a vehicle 10 and is used to control the elements 25 in a manner tending to tilt the axis of telescopic assembly 14 towards minimizing the detected imbalance in radiation as received. The control signals can in addition be used to provide an attitude control of the vehicle 10 as a whole operating in the same direction so that in fact the deviation of the telescope 14 from a center axis orientation remains minimal.

In other words, the vehicle is caused to follow the telescopic rod's orientation towards axis alignment. This will bring the vehicles into near alignment.

In furtherance of the invention and particularly in order to reduce any "noise" it may be advisable to construct the homing beacon and light transmitter 27 as a beacon which emits modulated light so that the control circuit connected to the central 26 will respond, e.g., to the relative amplitude of the modulation only.

The invention is not limited to the embodiments described above, but all changes and modifications thereof not constituting departures from the spirit and scope of the invention are intended to be included.

We claim:

1. A docking and coupling structure connected to and associated with two space vehicles and respectively including first and second coupling devices comprising:

said first device including a telescopic rod means carrying a head, there being retractable and protractable latch elements provided in said head;

sensor means on said head;

a platform mounted to the respective vehicle by means of a plurality of springs being eccentrically mounted to the platform and together supporting said telescopic rod means being mounted centrally on said platform permitting a resilient deflection of the axis of the telescopic rod means from a center axis defined with respective said vehicle having said first device;

active control means for pivoting said telescopic mast for as to alter its direction, independently from any passive deflection on account of the plural springs;

said second device including a coupling funnel having a bottom and bottom opening constructed as latch trap for receiving said head and said coupling and latch elements;

means in the bottom opening of the funnel for cooperation with the sensor means such that the sensor means can locate the bottom opening; and an annular buffering and cushioning means on said telescopic rod means for centering and limiting insertion in said funnel upon docking.

2. A device as in claim 1, said sensor means being light detection means operating with a light transmitter mounted in said funnel of said second device.

3. Device as in claim 1 said control means additionally affecting the attitude of the respective vehicle.

4. A docking and coupling structure connected to and associated with two space vehicles and respectively including first and second coupling devices comprising:

said first device including a telescopic rod means carrying a head, there being retractable and protractable latch elements provided in said head;

a platform mounted to the respective vehicle by means of a plurality of springs, the springs in turn being mounted individually to adjustable control elements;

said telescopic rod means being mounted on said platform and the plurality of springs permitting a resilient deflection of the axis of the telescopic rod means from a center axis defined with respect said vehicle having said first device;

said second device including a coupling funnel having a bottom and bottom opening constructed as latch trap for receiving said head and said coupling and latch elements; and an annular buffering and cushioning means on said telescopic rod means for centering and limiting insertion in said funnel upon docking.

5. Device as in claim 4 and including active control means for causing the rod to be aligned with the funnel.

* * * * *